(12) United States Patent
Cheng (10) Patent No.: US 8,998,241 B1
(45) Date of Patent: Apr. 7, 2015

(54) FOLDABLE STRUCTURE FOR BABY STROLLER

(71) Applicant: Pao-Hsien Cheng, Tainan (TW)

(72) Inventor: Pao-Hsien Cheng, Tainan (TW)

( * ) Notice: Subject to any disclaimer, the term of this patent is extended or adjusted under 35 U.S.C. 154(b) by 0 days.

(21) Appl. No.: 14/485,982

(22) Filed: Sep. 15, 2014

(51) Int. Cl.
*B62B 7/06* (2006.01)
*B62B 7/08* (2006.01)
*B62B 9/10* (2006.01)

(52) U.S. Cl.
CPC .............. *B62B 7/062* (2013.01); *B62B 9/102* (2013.01); *B62B 7/08* (2013.01)

(58) Field of Classification Search
USPC ............. 280/642, 647, 650, 658, 47.38, 47.4, 280/47.41
See application file for complete search history.

(56) References Cited

U.S. PATENT DOCUMENTS 7,641,216 B2 * 1/2010 Cone, II .................... 280/642

FOREIGN PATENT DOCUMENTS

| TW | M288610 | 11/1984 |
|---|---|---|
| TW | M312478 | 9/1995 |
| TW | M319208 | 1/1996 |
| TW | M407192 U1 | 7/2011 |
| TW | I429550 B | 3/2014 |
| TW | M474677 U | 3/2014 |

* cited by examiner

*Primary Examiner* — Hau Phan
*Assistant Examiner* — Bryan Evans
(74) *Attorney, Agent, or Firm* — Rosenberg, Klein & Lee (57) ABSTRACT

A foldable structure for baby strollers is revealed. The foldable structure includes two joints at each side thereof. A push rod, a front support with a sliding member and a rear support are pivotally connected to each joint. The sliding member is linked to the push rod and the rear support by an upper link and a lower link respectively. A quadrilateral linkage is arranged between the two front supports while a seat is pivotally connected to and located above the quadrilateral linkage. The quadrilateral linkage is linked to front wheel sets and the sliding members. Thereby the quadrilateral linkage is driven to move through the upper and the lower links and the sliding members when the joint is released from a locked state and the push rod is pushed forward. The front wheel sets are also folded. Thus the baby stroller is folded into a compact size.

18 Claims, 7 Drawing Sheets

FIG. 7

FOLDABLE STRUCTURE FOR BABY STROLLER

BACKGROUND OF THE INVENTION

1. Fields of the Invention

The present invention relates to a baby stroller, especially to a foldable structure for a baby stroller by which the baby stroller can be folded into a compact size for easy carriage, storage, and transportation.

2. Descriptions of Related Art

Generally, the four-wheel baby strollers available now are divided into two groups. One kind of baby stroller is able to be folded horizontally and vertically at the same time. For example, baby strollers revealed in Taiwanese Pat. No. M474677 "foldable structure for baby stroller", Taiwanese Pat. No. M319208 "foldable frame of baby stroller", Taiwanese Pat. No. M407192 "folding device for baby stroller" are this kind of baby stroller. This kind of baby stroller is generally formed by a flexible fabric in combination with a frame. The other kind of baby stroller is foldable only in the vertical direction, such as baby strollers revealed in Taiwanese Pat. No. I429550 "foldable baby stroller", Taiwanese Pat. No. M312478 "foldable frame of baby stroller", and Taiwanese Pat. No. M288610 "foldable frame of baby stroller". Due to no foldable structure in the horizontal direction, a seat of this kind of baby stroller has a hard-shell structure. Sometimes the seat is designed to be able to remove from a main body of the baby stroller. Thus different modes in use are provided according to user's requirements.

As to the baby stroller with the vertical foldable structure, only a frame of the baby stroller can be folded while front wheels are unable to be moved and folded with the frame at the same time. In some baby strollers, the seat even needs to be removed during the folding process. This causes inconvenience in use.

SUMMARY OF THE INVENTION

Therefore it is a primary object of the present invention to provide a foldable structure for baby strollers in which front wheel sets can be folded at the same time and there is no need to remove a seat. Thus the baby stroller is more convenient for users to use.

In order to achieve the above object, a foldable structure of baby stroller of the present invention includes two joints respectively arranged at each of two sides thereof. The joint is pivotally connected to a push rod, a front support disposed with a sliding member and a rear support. The sliding member is pivotally connected to one end of an upper link and one end of a lower link while the other end of the upper link and the other end of the lower link are pivotally connected to the push rod and the rear support respectively. A connection member is disposed between the two front supports while the quadrilateral linkage is pivotally connected to and located above the connection member. A seat is pivotally connected to and arranged above the quadrilateral linkage. The quadrilateral linkage is connected to the sliding member and a front wheel set by a crank and a front link respectively. Thereby the quadrilateral linkage is driven to move through the upper and the lower links, the sliding members and the cranks when the joint is released from a locked state and the push rod is pushed forward. The front wheel sets linked are also moved. Thus the whole baby stroller is folded easily.

Moreover, a top end of each vertical rod on the front side of the quadrilateral linkage is pivotally connected to a horizontal seat adjustment piece. Then the horizontal seat adjustment piece is pivotally connected to the seat so as to adjust the horizontal position of the seat and prevent the seat from being inclined forward.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Refer from FIG. 1 to FIG. 4, a foldable structure for baby strollers includes a joint 1 at each of two sides thereof. A push rod 2 is extended upward from and pivotally connected to the two joints 1. A front support 3 is extended forward from each joint 1 while a rear support 4 is extended downward from each joint 1. A sliding member 31 is fitted over the front support 3, located close to the joint 1. One end of an upper link 32 and one end of a lower link 33 are pivotally connected to the sliding member 31 respectively. The other end of the upper link 32 is pivotally connected to the push rod 2 at the position close to the joint 1 while the other end of the lower link 33 is pivotally connected to the rear support 4 at the position close to the joint 1. A connection member 5 is disposed between the two front supports 3. The four corners of the connection member 5 are pivotally connected to a quadrilateral linkage 6. The quadrilateral linkage 6 includes four vertical rods 61 and two horizontal rods 62. Each vertical rod 61 is pivotally connected to one of the four corners of the connection member 5 correspondingly while the horizontal rod 62 is arranged between and pivotally connected to two of the vertical rods 61 at the same side. A top end of each vertical rod 61 is pivotally connected to a seat 7. By the movement of the quadrilateral linkage 6, the seat 7 can be lifted up to a lifted position or down to a lowered position. Moreover, each of the two vertical rods 61 at the rear side of the quadrilateral linkage 6 is pivotally connected to one end of a crank 611 while the other end of the crank 611 is connected to the sliding member 31 at the same side. Each of the two vertical rods 61 at the front side of the quadrilateral linkage 6 is pivotally connected to one end of a front link 612 while the other end of the front link 612 is connected to a front wheel set 34. The front wheel set 34 is pivotally connected to one end of the front support 3 opposite to the end of the front support 3 pivotally connected to the joint 1.

Figure 1:
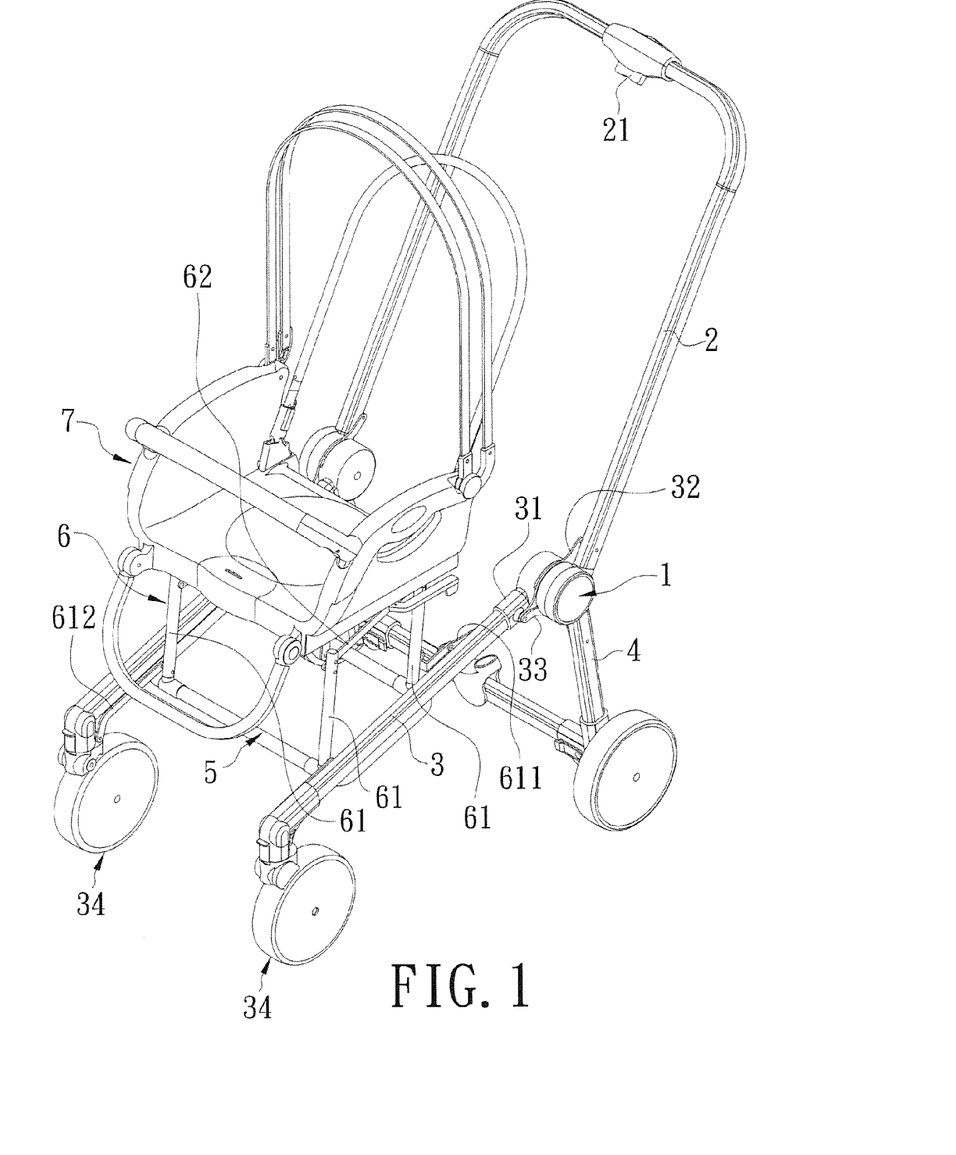
FIG. 1 is a perspective view of an embodiment of a foldable structure for baby strollers according to the present invention.
Figure 2:
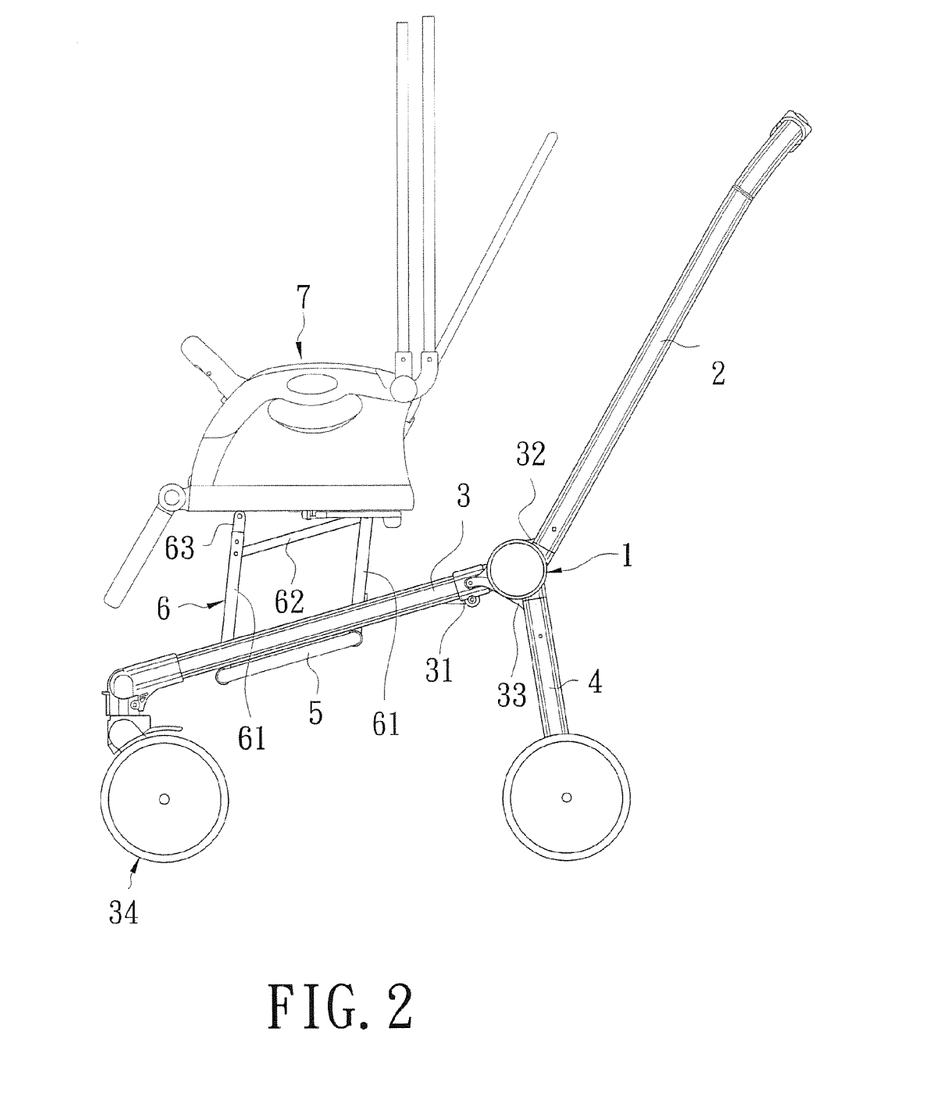
FIG. 2 is a schematic drawing showing a side view of an embodiment of a foldable structure for baby strollers according to the present invention.
Figure 3:
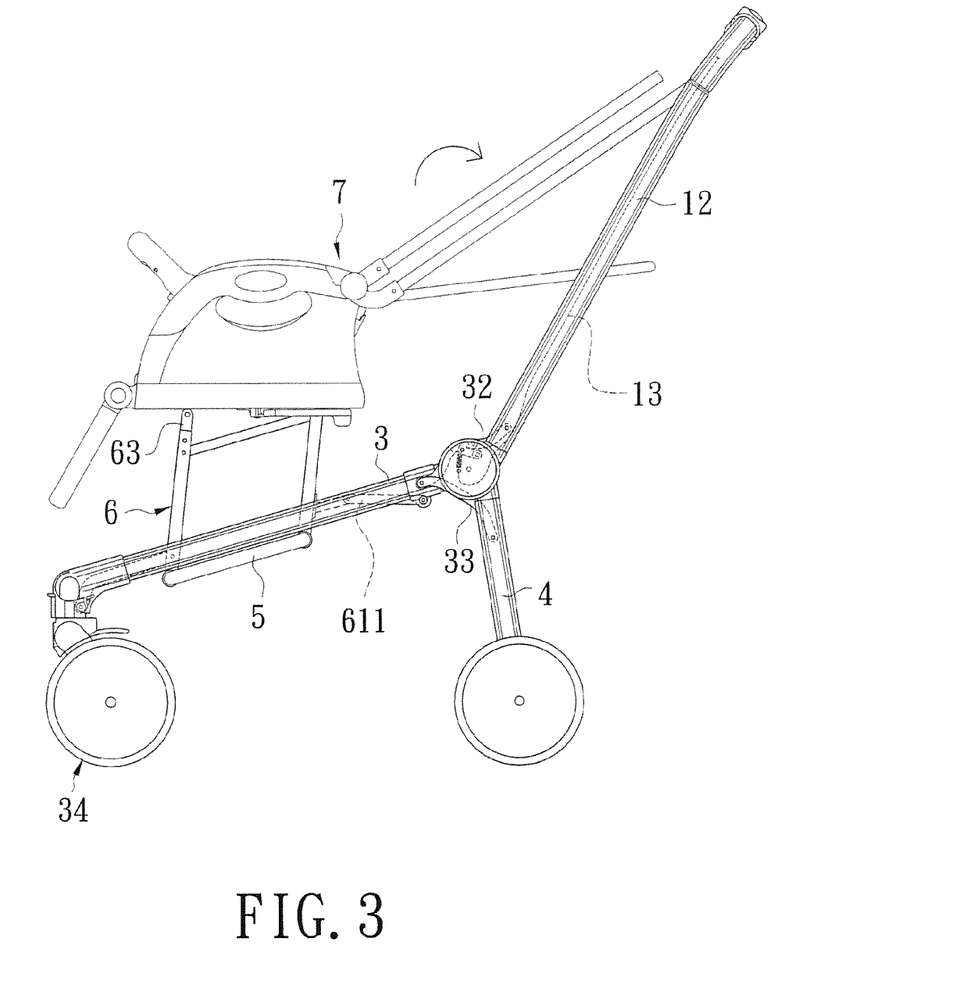
FIG. 3 is another schematic drawing showing a side view of an embodiment of a foldable structure for baby strollers according to the present invention.
Figure 4:
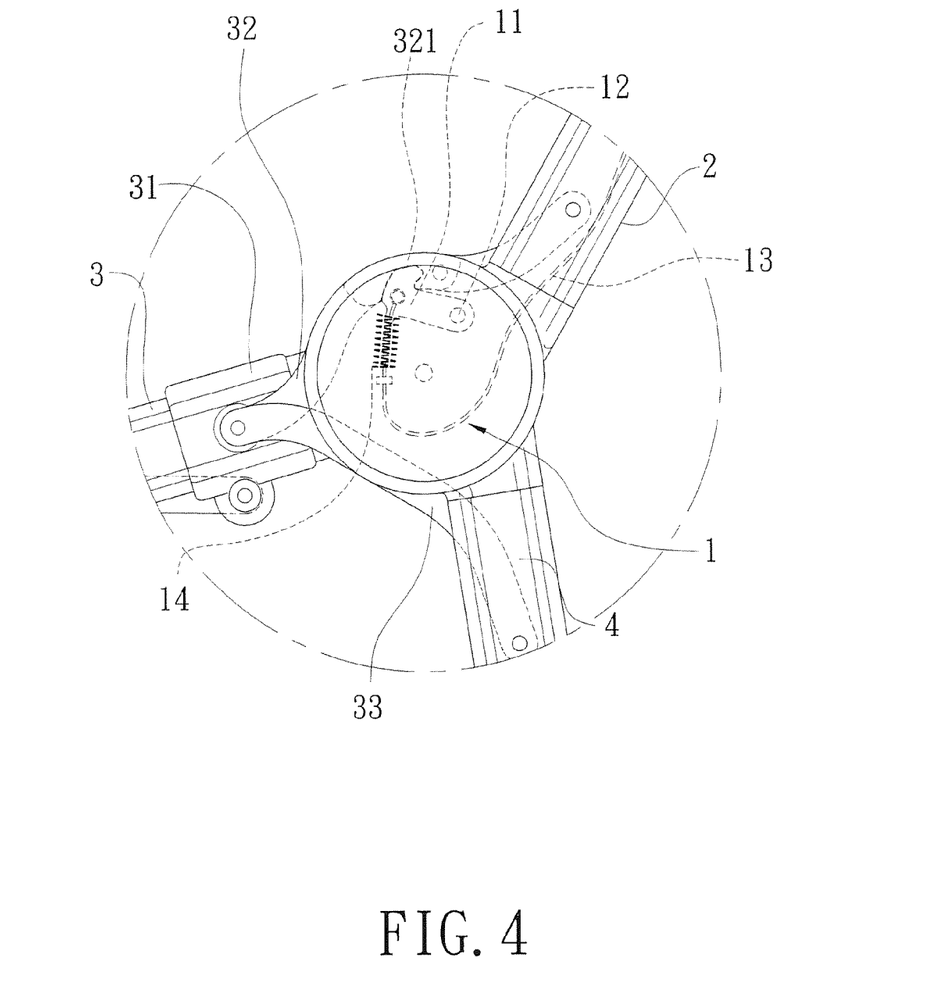
FIG. 4 is a schematic drawing showing a partial side view of an embodiment of a foldable structure for baby strollers according to the present invention.

Moreover, refer to FIG. 4, a lock hook 11 is disposed in the joint 1 and the upper link 32 is arranged with a hook groove 321. The lock hook 11 can be hooked in the hook groove 321 correspondingly so as to make the joint 1 become in a locked state. The lock hook 11 is pivotally connected to the joint 1 by a pivot shaft 12. A free end of the lock hook 11 is connected to an operation wire 13 while an elastic recovery member 14 is arranged between one side of the lock hook 11 (connected to the operation wire 13) and the joint 1. The operation wire 13 is connected to a folding switch 21 set on the push rod 2. The lock hook 11 is driven to move by the operation wire 13 while the folding switch 21 being pressed.

Figure 5:
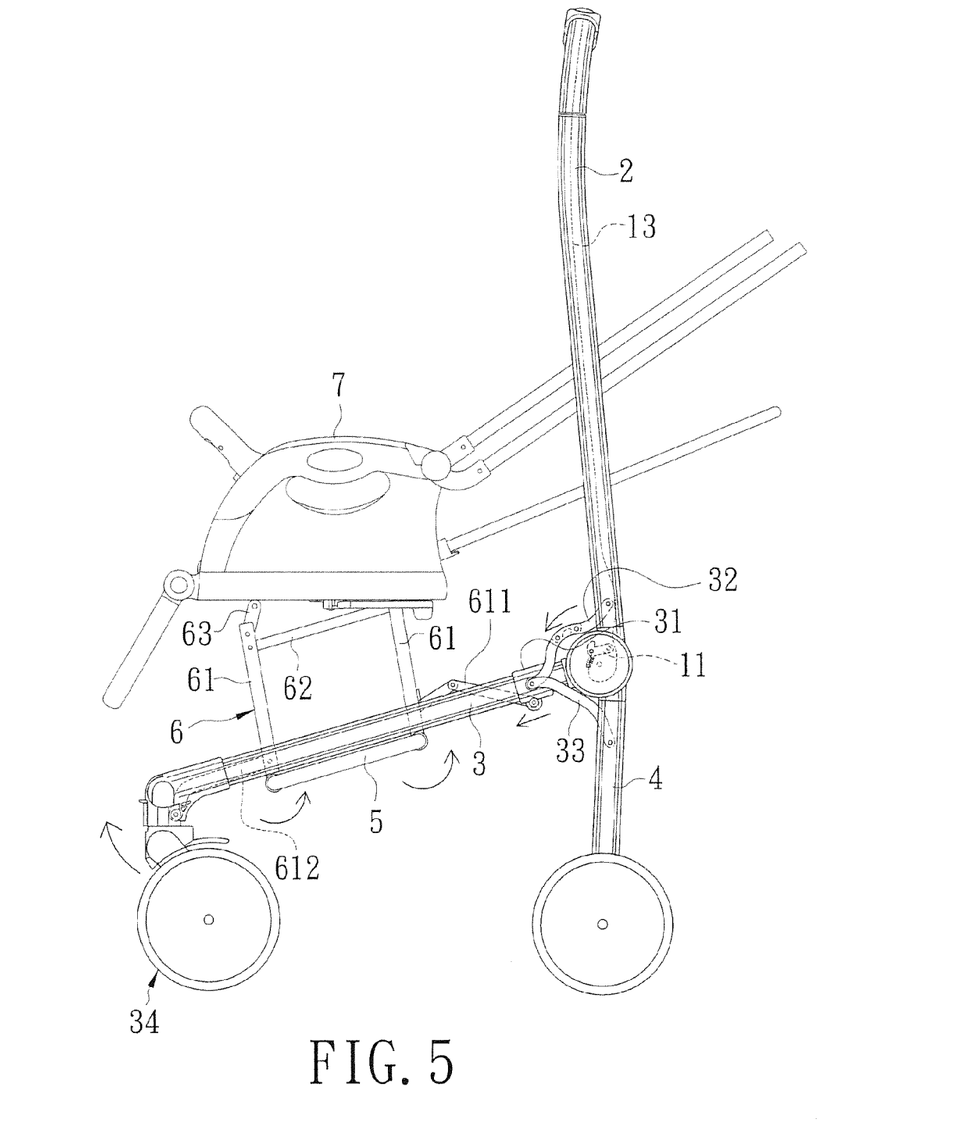
FIG. 5 is a schematic drawing showing a side view of an embodiment of a foldable structure for baby strollers while being folded according to the present invention.
Figure 6:
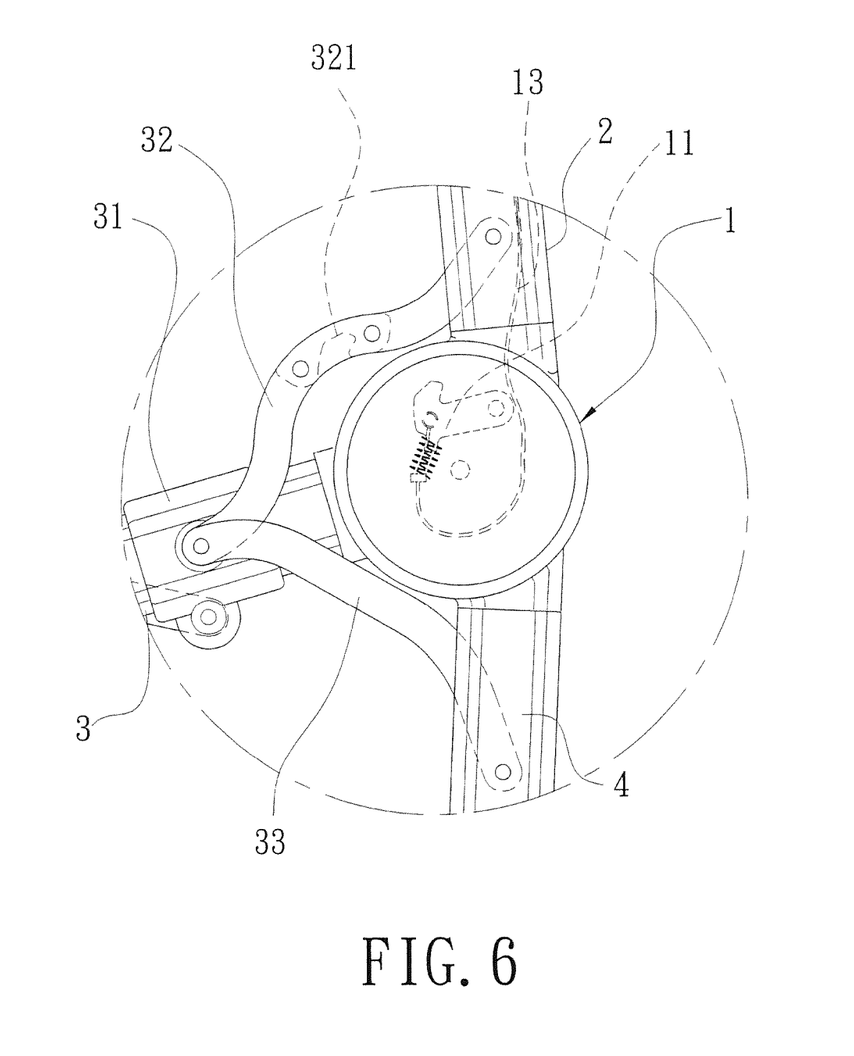
FIG. 6 is a schematic drawing showing a partial side view of an embodiment of a foldable structure for baby strollers while being folded according to the present invention.
Figure 7:
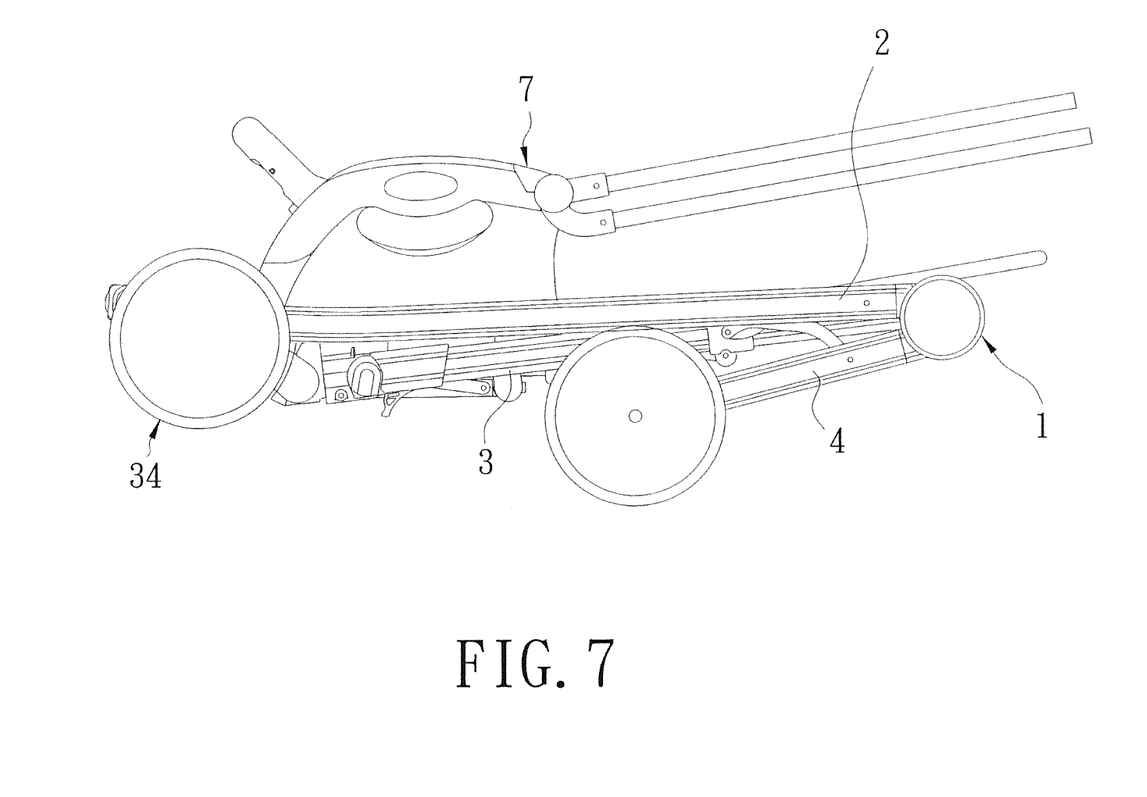
FIG. 7 is a schematic drawing showing a side view of an embodiment of a foldable structure for baby strollers after being folded according to the present invention.

Refer to FIG. 5, FIG. 6 and FIG. 7, the folding switch 21 on the push rod 2 is operated directly to move the operation wire 13 and the operation wire 13 further drives the lock hook 11. Thus the lock hook 11 is released from the hook groove 321 of the upper link 32 and the joint 1 is released from the locked state. Now, the push rod 2 can be pushed to move forward around the joint 1. The upper link 32 and the lower link 33 linked are also moved to drive the sliding member 31 sliding toward the front wheel set 34. Through the crank 611, the sliding member 31 drives the quadrilateral linkage 6 to move. Thus the seat 7 is moved to the lowered position by the quadrilateral linkage 6. Then the seat 7 is further moved toward the front wheel sets 34 through the front links 612 of the quadrilateral linkage 6. Thus the seat 7 is further moved together with the front wheel sets 34 through the quadrilateral linkage 6 and the front links 612 to be folded into a flat form.

Furthermore, the lower link 33 can also be disposed with a hook groove (not shown in figure) in which the lock hook 11 is locked so as to make the joint 1 become in the locked state.

While being extended, the push rod 2 is pulled in the opposite direction. Thus the baby stroller is extended through the movement of the upper links 32, the lower links 33, the sliding members 31, the cranks 611, the quadrilateral linkage 6, the front links 612, the front supports 3 and the rear supports 4 linked to one another. After the lock hook 11 is locked into the hook groove 321 of the upper link 32 again, the baby stroller is fixed and locked at the extended state.

In addition, the baby stroller of the present invention further includes a horizontal seat adjustment piece 63 pivotally connects to a top end of each vertical rod 61 on the front side. And each of the two vertical rods 61 on the front side is pivotally connected to the seat 7 by the horizontal seat adjustment piece 63. The horizontal seat adjustment piece 63 is used to adjust the horizontal position of the seat 7 and prevent the seat 7 from being inclined too much so as to ensure baby's safety.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A foldable structure for a baby stroller comprising two joints;
    a push rod pivotally connected to each of the joints,
    a front support connected to each of the joints and having a sliding member fitted thereover and located close to the joint;
    a rear support connected to each of the joints;
    a quadrilateral linkage that is pivotally connected between the two front supports; and
    a seat that is pivotally connected to and located above the quadrilateral linkage;
    wherein the sliding member is pivotally connected to and moved together with the push rod and the rear support by an upper link and a lower link respectively; the quadrilateral linkage is linked to two front wheel sets and the two sliding members; the two front wheel sets are pivotally connected to one end of the front support opposite to the end of the front support pivotally connected to the joint; when the joint is released from a locked state, the sliding members are pushed by the push rod through the upper link and the lower link; the quadrilateral linkage is also moved together with the sliding members so as to make the seat move to a lowered position; the seat is further moved together with the front wheel sets by the quadrilateral linkage to be folded into a flat form.

2. The structure as claimed in claim 1, wherein a lock hook is disposed in the joint while the upper link or the lower link is arranged with a hook groove; the lock hook is hooked in the hook groove so as to make the joint become in a locked state.

3. The structure as claimed in claim 2, wherein the lock hook is pivotally connected to the joint by a pivot shaft and a free end of the lock hook is connected to an operation wire while an elastic recovery member is arranged between one side of the lock hook connected to the operation wire, and the joint.

4. The structure as claimed in claim 3, wherein a connection member is disposed between the two front supports and the connection member is pivotally connected to the quadrilateral linkage.

5. The structure as claimed in claim 4, wherein the quadrilateral linkage includes four vertical rods and two horizontal rods; each of the four vertical rods is pivotally connected to one of the four corners of the connection member while the horizontal rod is arranged between and pivotally connected to two of the vertical rods at the same side; a seat is pivotally connected to and located above the four vertical rods.

6. The structure as claimed in claim 5, wherein a top end of each of two of the vertical rods on a front side is pivotally connected to a horizontal seat adjustment piece; then the top end of each of the two vertical rods on the front side is pivotally connected to the seat by the horizontal seat adjustment piece.

7. The structure as claimed in claim 4, wherein the quadrilateral linkage is linked to the two sliding members by two cranks respectively.

8. The structure as claimed in claim 7, wherein the quadrilateral linkage includes four vertical rods and two horizontal rods; each of the four vertical rods is pivotally connected to one of the four corners of the connection member while the horizontal rod is arranged between and pivotally connected to two of the vertical rods at the same side; a seat is pivotally connected to and located above the four vertical rods.

9. The structure as claimed in claim 8, wherein a top end of each of two of the vertical rods on a front side is pivotally connected to a horizontal seat adjustment piece; then the top end of each of the two vertical rods on the front side is pivotally connected to the seat by the horizontal seat adjustment piece.

10. The structure as claimed in claim 7, wherein the quadrilateral linkage is linked to the two front wheel sets by two front links respectively.

11. The structure as claimed in claim 10, wherein the quadrilateral linkage includes four vertical rods and two horizontal rods; each of the four vertical rods is pivotally connected to one of the four corners of the connection member while the horizontal rod is arranged between and pivotally connected to two of the vertical rods at the same side; a seat is pivotally connected to and located above the four vertical rods.

12. The structure as claimed in claim 11, wherein a top end of each of two of the vertical rods on a front side is pivotally connected to a horizontal seat adjustment piece; then the top end of each of the two vertical rods on the front side is pivotally connected to the seat by the horizontal seat adjustment piece.

13. The structure as claimed in claim 1, wherein a connection member is disposed between the two front supports and the connection member is pivotally connected to the quadrilateral linkage.

14. The structure as claimed in claim 13, wherein the quadrilateral linkage is linked to the two sliding members by two cranks respectively; the quadrilateral linkage is linked to the two front wheel sets by two front links respectively.

15. The structure as claimed in claim 2, wherein a connection member is disposed between the two front supports and the connection member is pivotally connected to the quadrilateral linkage.

16. The structure as claimed in claim 15, wherein the quadrilateral linkage is linked to the two sliding members by two cranks respectively; the quadrilateral linkage is linked to the two front wheel sets by two front links respectively.

17. The structure as claimed in claim 1, wherein the quadrilateral linkage is linked to the two sliding members by two cranks respectively; the quadrilateral linkage is linked to the two front wheel sets by two front links respectively.

18. The structure as claimed in claim 1, wherein the quadrilateral linkage is linked to the two sliding member by two cranks respectively; the quadrilateral linkage is linked to the two front wheel sets by two front links respectively.

* * * * *